No. 704,821. Patented July 15, 1902.
I. N. & J. H. GLAUBER.
PLUG AND COUPLING FOR WATER OR STEAM PIPES.
(Application filed Jan. 15, 1902.)
(No Model.)
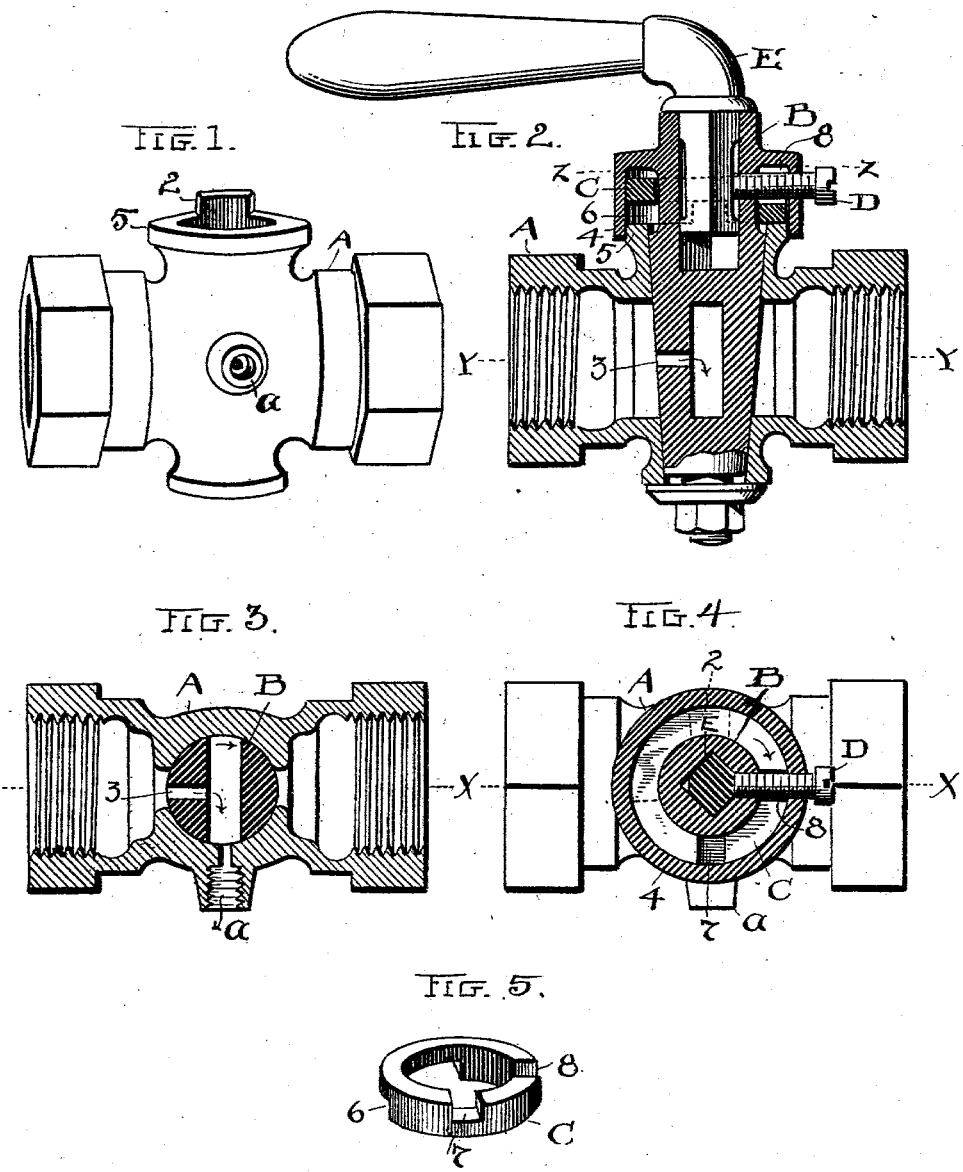
ATTEST
R. B. Moore
Mrs. L. A. Kulick
INVENTORS
Isaac N. Glauber
Joseph H. Glauber
By H. V. Fisher, Atty

UNITED STATES PATENT OFFICE.

ISAAC N. GLAUBER AND JOSEPH H. GLAUBER, OF CLEVELAND, OHIO.

PLUG AND COUPLING FOR WATER OR STEAM PIPES.

SPECIFICATION forming part of Letters Patent No. 704,821, dated July 15, 1902.

Application filed January 15, 1902. Serial No. 89,834. (No model.)

*To all whom it may concern:*

Be it known that we, ISAAC N. GLAUBER and JOSEPH H. GLAUBER, citizens of the United States, residing at Cleveland, State of Ohio, have invented certain new and useful Improvements in Plugs and Couplings for Water or Steam Pipes; and we do declare that the following is a full, clear, and exact description of the invention, which will enable others skilled in the art to which it appertains to make and use the same.

Our invention relates to plugs and couplings for water and steam pipes; and the invention consists in a plug and coupling, substantially as shown and described, and particularly pointed out in the claims.

In the accompanying drawings, Figure 1 is a perspective elevation of the coupling or pipe joint alone. Fig. 2 is a vertical central sectional elevation lengthwise centrally of both the coupling and the plug on a line corresponding to $x\,x$, Figs. 3 and 4. Fig. 3 is a plan view of the coupling and plug on sectional line $y\,y$, Fig. 2; and Fig. 4 is a plan view of the coupling and plug on line $z\,z$, Fig. 2. Fig. 5 is a perspective view of the ring or collar which is adapted to be located within the cap of the plug and to operate in conjunction with the plug, substantially as hereinafter described.

A represent a coupling or joint for a pipe connection in water, steam, and other pipes having at its front a waste orifice or opening $a$ and on its top a single lug or shouldered projection 2. The relationship of the plug to the other parts of course is determined when the parts are put in place and according to the use to which they are applied at the time.

The plug B is shown as having an integral cap about its upper portion, which overlaps the upwardly-extending projection 5 upon the coupling and makes as close a lap as practicable about the side of the said projection, so that grit, sand, and the like will be excluded from the seat of the plug and from the collar within the cap. In this connection we employ a stop mechanism comprising a collar or ring C, Fig. 5, which is adapted to occupy the space within cap 4 about the plug and to rest upon the circular projection 5, encompassed by said cap. The said ring or collar C has a comparatively long segmental notch 6 on its bottom, adapted to seat over the lug or projection 2 and limit rotation in either direction, and on its top are recesses or notches 7 and 8, respectively, separated by one-fourth of the circumference of the ring.

A screw D is entered through the cap 4 on the plug and adapted to rest in either one of the recesses 7 and 8, according to the direction in which the waste is to come, and said screw is further engaged at its inner extremity in the body of the plug, where it bears against the head of removable handle E; so it follows, when the plug is turned by its handle E in either direction and screw D is lodged in one of the notches 7 and 8, that the collar C is rotated also and the limit of rotation of the parts is fixed by the length of the slot 6 on lug 2, and this slot allows only a quarter-turn. Hence if the screw be entered through notch 7 the waste will be from the right of Fig. 3, and if it be entered through notch 8 the waste will be from the left of Fig. 3, where it is shown as open. Obviously the projection 2 on the coupling-joint and the recess 6 in the collar could be reversed as to position and serve the same purpose, so that they are interchangeable shouldered projections or stops of the plug, however they are disposed. All plugs of this kind have to be ground to their own seats, and this is done by turning the plugs around in their seats. Then the said collar can be inserted and the plug screwed up at its bottom, and all is in readiness for use. Thereafter when a change of direction of waste is wanted it is only necessary to withdraw screw C, so as to pass from one notch 7 or 8 to the other, and this is done by rotating the plug to the right place, when screw D is again entered. The handle E is preferably a separate part and can easily be changed to bring it in front; but for out-of-doors underground work the handle can be integral with the plug and so shaped as to be rotated by means of a key from above. For such use the ring or collar C may be omitted, in which case there is no limit upon the rotation of the plug.

The screw-stop D serves practically as a pin or plug and may be substituted by an unthreaded pin or plug, if desired.

The plug B is best made in a single piece, but may be made in two or more pieces or sections permanently fastened together.

What we claim is—

1. The coupling-joint and the plug having an integral cap overhanging the plug-seat, a collar within said cap constructed to limit the rotation of the plug, a stop on the plug to engage said collar and means to lock said collar rotatably to said plug, substantially as described.

2. The coupling-joint and the plug, a collar engaged to rotate with the plug and the said collar and joint constructed to limit the rotation of the plug and the said plug having an integral cap, substantially as described.

3. The coupling-joint having a plug-seat and a shouldered projection at the top of said seat, a plug having an integral cap about its top and a collar within the cap constructed with a recess to engage said shouldered projection, and a pin through said cap and plug to engage said collar and limit the rotation of the plug, substantially as described.

4. The coupling-joint having a seat for a plug and an upward projection at the top of said seat, a plug in said joint and a free collar about the top thereof having a recess corresponding to said projection and provided with a notch on its top, and a threaded stop extending through the plug into engagement with said notch, substantially as described.

5. The coupling-joint and the plug therein, a collar constructed to have a limited rotation on said joint and having a set of notches on its top, and a screw engaged through the plug in one of said notches, and the said plug having an integral cap overlapping said collar, substantially as described.

Witness our hands to the foregoing specification this 28th day of December, 1901.

ISAAC N. GLAUBER.
JOSEPH H. GLAUBER.

Witnesses:
R. B. MOSER,
TERESSA M. MADDEN.